United States Patent Office 2,753,306
Patented July 3, 1956

2,753,306

ORGANO-METALLIC DERIVATIVES OF PHOSPHORUS SULFIDE-HYDROCARBON REACTION PRODUCTS AND LUBRICANTS CONTAINING SAME

Ellis K. Fields, Chicago, Ill., assignor to Standard Oil Company, Chicago, Ill., a corporation of Indiana No Drawing. Application December 30, 1952, Serial No. 328,822

17 Claims. (Cl. 252—46.4)

The present invention is directed to novel organo-metallic derivatives of phosphorus sulfide-hydrocarbon reaction products and to their use as lubricant additives. More particularly, it concerns novel molybdenum or vanadium-containing organic derivatives of such products and their use as additives to lubricating oils to impart extreme pressure characteristics thereto.

It has heretofore been discovered that certain reaction products of a phosphorus sulfide and a hydrocarbon, particularly a hydrocarbon such as an olefin or an olefin polymer, when added to lubricants, such as a hydrocarbon oil, in small amounts, are effective in inhibiting the formation of varnish, sludge, carbon and the like, during the use of such lubricants. Preparation of such reaction products is described in U. S. 2,315,529 granted to Charles D. Kelso and in U. S. 2,316,078 granted to Clarence M. Loane and James W. Gaynor which issued on April 6, 1943. It has now been found that certain novel organo-metallic derivatives of such reaction products may be readily prepared and that such derivatives are valuable extreme pressure additives for lubricants.

It is an object of the present invention to provide novel extreme pressure additives for introduction to lubricating oils and a method of preparing same. A particular object of this invention is to provide novel heavy metal-containing organic derivatives of phosphorus sulfide-hydrocarbon reaction products having particular utility as extreme pressure additives in lubricating oils. A further object is to provide novel organo-metallic derivatives of certain phosphorus and sulfur-containing organic compounds which have extreme pressure properties in addition to having substantial detergent and sludge inhibiting properties when added to mineral lubricating oils. Other objects and advantages of the present invention will become apparent from the following description thereof.

It has been discovered that certain novel heavy metal derivatives of the product resulting from the reaction of a mercapto or hydroxy compound with a phosphorus sulfide-hydrocarbon reaction product are useful extreme pressure additives. Thus, in accordance with the present invention, phosphorus and sulfur-containing compounds are prepared by reacting a phosphorus sulfide with a hydrocarbon (as will hereinafter be described in detail) and the resulting phosphorus and sulfur-containing product is then reacted with a mercapto or hydroxy compound, e. g., an alcohol, phenol, mercaptan, or thiophenol, to produce substantially neutral organic derivatives which will hereinafter be referred to as an "intermediate product." These intermediate products are then reacted with a compound of molybdenum or vanadium affording an oxide of the respective metal under reaction conditions, and hydrogen peroxide to produce novel compositions particularly suitable for use as extreme pressure additives in lubricants. Examples of suitable metal compounds are the oxides and sulfides of molybdenum and vanadium, the salts of molybdic and vanadic acids with weak bases, etc. Without being bound by any theory expressed or implied it is believed that the oxides, under reaction conditions, react as an acid of either molybdenum or vanadium. The oxides of the metals, particularly the trioxides, are preferred for use in accordance herewith. The intermediate products are prepared by reacting a mercapto or hydroxy compound with a suitable phosphorus and sulfur-containing product at a temperature within the range of from about 150° to about 500° F., and preferably from about 200° to about 400° F. These may then be reacted with an oxide or sulfide of molybdenum or vanadium, or with a salt of molybdic or vanadic acid with a weak base, in the presence of hydrogen peroxide to produce the novel metallo-organo derivatives of the phosphorus sulfide-hydrocarbon reaction products. The latter reaction occurs readily at temperatures within the range of from about 25° to about 200° F., and preferably from about 70° to about 130° F. A reaction time of from about 1 to 14 hours, preferably from about 4 to 10 hours, has been found to be particularly desirable. Relative quantities of the various reactants, both in the preparation of the intermediate product and the metal derivative thereof, may vary over a considerable range and these will be referred to in detail in the ensuing description of the invention.

Phosphorus sulfide-hydrocarbon reaction products of the type which may be employed in accordance herewith may be readily obtained by reacting a phosphorus sulfide with a hydrocarbon at a temperature of from about 200° F. to about 600° F., and preferably from about 250° F. to about 500° F., using from about 1% to about 50%, and preferably from about 5% to about 25%, by weight, of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess of phosphorus sulfide can be used and separated from the product by filtration or by dilution with a solvent, such as hexane, filtering and subsequently removing the solvent by suitable means, such as by distillation. These reaction products may be further treated by blowing with nitrogen at an elevated temperature of from about 200° F. to about 600° F. to improve their odor. The phosphorus sulfide-hydrocarbon reaction products contain both sulfur and phosphorus. The reaction may, if desired, be carried out in the presence of an additional sulfurizing agent or the phosphorus sulfide-hydrocarbon reaction product can be sulfurized, as described in U. S. 2,316,087 issued April 6, 1943, to James W. Gaynor and Clarence M. Loane.

The hydrocarbon constituent of this reaction is preferably a mono-olefin hydrocarbon polymer resulting from the polymerization of low molecular weight mono-olefinic hydrocarbons or isomono-olefinic hydrocarbons, such as propylene, butylenes, and amylenes or the copolymers obtained by the polymerization of hydrocarbon mixtures containing isomono-olefins and mono-olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and iso-mono-olefin polymers having molecular weights ranging from about 150 to about 50,000 or more, and preferably from about 300 to about 10,000. Such polymers can be obtained, for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts types such as, for example, boron fluoride, aluminum chloride, and the like. In the preparation of these polymers I may employ, for example, a hydrocarbon mixture containing isobutylene, butylenes and butanes recovered from petroleum gases, especially those gases produced in the cracking of petroleum oils in the manufacture of gasoline. U. S. Patent 2,407,873 to Evering et al. describes a particularly suitable technique for polymerizing such olefins in the presence of an aluminum-chloride-hydrocarbon complex catalyst.

Essentially paraffinic hydrocarbons such as bright stock residuums, lubricating oil distillates, petrolatums or paraffin waxes may be used. The condensation products of any of the foregoing hydrocarbons or their halogen derivatives, with aromtatic hydrocarbons can also be employed.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils. Other olefins suitable for the preparation of the herein described phosphorus sulfide reaction products are olefins having at least 20 carbon atoms in the molecule of which from about 12 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

Also contemplated within the scope of the present invention are the reaction products of a phosphorus sulfide with aromatic hydrocarbons such as benzene, naphthalene, anthracene, toluene, diphenyl, etc., and an alkylated aromatic hydrocarbon such as, for example, an alkyl benzene characterized by having at least one alkyl group of at least four carbon atoms, and preferably at least eight carbon atoms such as a long chain paraffin wax.

The phosphorus sulfide reactant can be any phosphorus sulfide, such as for example, $P_2S_3$, $P_4S_3$, $P_4S_7$, and preferably $P_2S_5$.

In accordance with the present invention, the mercapto and hydroxy compounds suitable for reaction with the phosphorus sulfide-hydrocarbon reaction products include alcohols, mercaptans, phenols, and thiophenols. Examples of alcohols suitable for use are either mono or poly hydroxy compounds which may be cyclic or alicyclic. Thus, such alcohols as methanol, ethanol, n-propanol, isopropanol, hexanol, decanol, dodecanol, octadecanol, cyclohexanol, cyclopentanol, benzyl alcohol, ethylene glycol, propylene glycol, glycerol, etc., may be empoyed.

Exampes of the various phenols which may be employed are phenol, the isomers of cresol, diamylphenol, p-tertiary butylphenol, nonyl phenol, etc. Similarly, the poly hydroxy phenols and alkyl-substituted poly hydroxy phenols such as hydroquinone, catechol, resorcinol, pyrogallol, hydroxy hydroquinone, etc., may be used.

Suitable mercaptans include both cyclic and alicyclic mercaptans such as methyl, ethyl, butyl, nonyl, lauryl, octadecyl, cyclohexyl, etc. Examples of thiophenols useful in accordance herewith are thiophenol, thiocresol, etc. On a weight basis, the ratio of hydroxy or mercapto compound to phosphorus sulfide-hydrocarbon reaction product may vary from about 1:5 to about 50:1, and preferably from about 1:1 to about 10:1. The preparation of these intermediate products is readily accomplished at temperatures in the range of from about 150° F. to about 500° F., and preferably from about 200° to about 400° F. Reaction times of at least about one-half hour and preferably from about 2 to about 100 hours have been found satisfactory. Mixtures of various mercapto or hydroxy compounds, for example, mercaptans—such as are recovered in petroleum desulfurization processes; alcohols—derived from the so-called Synthol or hydrocarbon synthesis process wherein carbon monoxide and hydrogen are converted catalytically to hydrocarbons and oxygenated compounds or from the Oxo process wherein carbon monoxide, hydrogen and olefins may be catalytically converted to aldehydes and alcohols; phenols and thiophenols—resulting from caustic washing of petroleum stocks, etc. may be employed. It should be understood that enumeration of the above specific examples is for purposes of illustration and not of limitation and that other suitable compounds falling within the definitions set forth, but specifically unnamed herein, may be employed.

The compounds of molybdenum or vanadium preferably employed in accordance herewith are those affording oxides of the respective metal under reaction conditions. Thus, the oxides and sulfides of molybdenum and vanadium, the salts of molybdic acid or vanadic acid with weak bases, etc., may be employed. For purposes of the present invention, a weak base is defined as one having a dissociation constant of about $1 \times 10^{-3}$ or lower. Examples of such bases particularly suitable for forming salts with molybdic and vanadic acids are ammonium hydroxide, triethyl ammonium hydroxide, etc. Of the oxides of molybdenum, molybdenum trioxide is preferably employed although other oxides of molybdenum such as molybdenum dioxide and molybdenum sesquioxide may be employed. Similarly, the various oxides of vanadium are useful although the trioxide is preferred in each instance. The ratio, on a weight basis, of metal compound to phosphorus sulfide-hydrocarbon reaction product may be from about 1:1 to about 1:40 and preferably from about 1:3 to about 1:20. As hereinabove indicated, the formation of these metal derivatives occurs readily at temperatures within the range of from about 25° to about 200° F., and preferably from about 70° to about 130° F. Reaction is ordinarily complete in from about 1 to about 14 hours.

Hydrogen peroxide is preferably employed in aqueous solution in accordance herewith. Thus, a solution of hydrogen peroxide containing from about 5% to 90% hydrogen peroxide, and preferably from about 15% to 50% may be employed. The quantity of peroxide employed, calculated as 100% hydrogen peroxide, may vary from about 1 part hydrogen peroxide to about 20 parts of the metal compound, to about 4 parts hydrogen peroxide to about 1 part of the metal compound. It has been found that the amount of metal compound which may be combined with the intermediate products is directly related to the amount of hydrogen peroxide employed, lesser amounts of metal compounds being contained in the ultimate product when smaller quantities of peroxide are employed.

A solvent may be employed as a reaction medium although such is not essential. One is particularly desirable, however, when very viscous phosphorus sulfide-hydrocarbon reaction products are employed. Solvents such as a light paraffin, e. g., hexane or an aromatic, e. g., benzene, are suitable for this purpose.

For purposes of illustrating the present invention and to enable those skilled in the art to better understand the method of preparing my novel compositions, the following examples are provided:

*Example 1*

A mixture of 108 parts by weight of a $P_2S_5$-hydrocarbon reaction product (prepared by reacting an isobutylene polymer having a mean molecular weight of 330, a viscosity of 210° F. of 40.6 S. S. U. and a specific gravity of .831, with $P_2S_5$ in a reaction mixture comprising 30% of the phosphorus sulfide, under an atmosphere of nitrogen at 400° F. for 6 hours) and 51 parts of amyl alcohol was heated at 315° F. for 20 hours. The product was thereafter stripped at 285° F. and 12 mm. vacuum to obtain 24.5 parts of unreacted alcohol and the remainder of the intermediate alcohol -$P_2S_5$-hydrocarbon reaction product. A mixture of 45 parts of the above intermediate product was then stirred at room temperature with 7.2 parts of molybdenum trioxide, and 16 parts by weight of 30% aqueous hydrogen peroxide were added dropwise over a two-hour period. An exothermic reaction resulted and the color of the reaction mixture changed from yellow to green. One hundred parts of hexane were then added, the hexane layer was centrifuged and decanted from a small amount of sludge, then evaporated, leaving a residue of 50 parts of a final organo metallic derivative of the phosphorus sulfide-hydrocarbon reaction product. This composition was dark-green and soluble in mineral oil. It contained 4.06% sulfur, 5.27% phosphorus and 7.04% molybdenum by weight.

Example 2

Twenty-five parts of a phosphorus and sulfur-containing compound (prepared by reacting 610 parts of decene-1 with 444.5 parts of $P_2S_5$ at 360°–380° F. for 4 hours) and 51 parts of n-hexanol were heated together at 260° F. for 16 hours and stripped of unreacted alcohol (37.5 parts of n-hexanol were thus recovered). Thirty parts of the reaction product of the hexanol and phosphorus and sulfur-containing compound were stirred with 7.2 parts of molybdenum trioxide and 25 parts of benzene at room temperature while 16 parts of 30% aqueous hydrogen peroxide were added dropwise. Agitation was continued for 3 hours after the addition was complete. The benzene layer was filtered and evaporated, leaving 34 parts of a dark-green product which was benzene soluble. This product contained 3.76% sulfur, 5.1% phosphorus and 4.8% molybdenum.

Example 3

Eighty-four parts of the same phosphorus sulfide-decene-1 reaction product referred to in Example 2 were heated with 33 parts of oxo nonyl alcohol (a mixture of isomeric $C_9$ alcohols resulting from the oxoation of isobutylene codimer and having a specific gravity of .838) at 330° F. for 20 hours following which the product was filtered and stripped in vacuum. One hundred and four parts of a nonyl alcohol derivative of the phosphorus sulfide-hydrocarbon reaction product was obtained. 28.6 parts of this intermediate nonyl alcohol derivative, 30 parts of benzene, and 7.2 parts of molybdenum trioxide were stirred together at room temperature while 16 parts of a 30% aqueous hydrogen peroxide solution were added dropwise over a two-hour period. The benzene solution was dried, filtered, evaporated, leaving a deep blue product which was oil-soluble and contained 3.23% sulfur, 3.22% phosphorus, and 6.31% molybdenum.

Example 4

Eighty-five parts of a phosphorus and sulfur-containing compound (prepared by reacting 85 parts of an isobutylene polymer (mean molecular weight 780, viscosity 1010 S. S. U. at 210° F. and specific gravity .881) with 15 parts of $P_2S_5$ at 440° F. for 6 hours) and 80 parts of n-hexanol were heated together at 330° F. for 28 hours and stripped of unreacted alcohol. Eighty-five parts of the resulting reaction product were then stirred with 16 parts of molydenum disulfide, 50 cc. of benzene, and 6.8 parts of 30% aqueous hydrogen peroxide. After 15 minutes, the temperature rose to about 150° F., and the mixture became green. Stirring was continued for 3 hours, the mixture was filtered and evaporated, leaving 86 grams of a deep green oil soluble product which analyzed 2.47% phosphorus, 5.35% sulfur, and 3.6% molybdenum.

Example 5

A mixture comprising 85 parts of the phosphorus and sulfur-containing product reacted with n-hexanol employed in Example 4, 50 cc. of benzene and 7.5 parts of vanadium trioxide were stirred while 4.8 parts of 30% aqueous hydrogen peroxide were added dropwise. Considerable gas and heat were involved during this addition and the resulting mixture was a dark-green. The mixture was stirred for an additional two hours after which it was filtered and evaporated, leaving 84 parts of a dark-green oil soluble product which analyzed 2.53% phosphorus, 5.15% sulfur, and 2.85% vanadium.

Example 6

Forty-five parts of the $P_2S_5$-polyisobutylene amyl alcohol product of Example 1, 10.5 parts ammonium molybdate $((NH_4)_6Mo_7O_{24}4H_2O)$ and 75 cc. benzene were stirred while 5.1 parts of 30% hydrogen peroxide were added dropwise. The mixture became hot and turned yellow, then green. It was stirred for 3 hours, treated with 150 cc. hexane, filtered through paper wet with hexane, and evaporated on the steam bath. The product, 48.5 parts, was a dark-green, viscous, oil-soluble liquid analyzing 7.47% molybdenum, 5.82% phosphorus, and 4.2% sulfur.

Example 7

42.5 parts of the $P_2S_5$-hydrocarbon reaction product described in Example 1, and 40.4 parts of n-dodecyl mercaptan were heated at 185°–200° C. for 23 hours, then stripped in vacuo, giving 50.9 parts reaction product. A mixture of 25.45 parts of this product, 7.7 parts molybdenum trioxide and 30 cc. benzene was stirred while 3.4 parts of 30% hydrogen peroxide were added dropwise. The mixture became hot and turned yellow, then green. It was stirred for 3 hours, treated with 100 cc. hexane, filtered and evaporated, yielding 52.6 parts blue-green viscous oil-soluble product which analyzed 2.57% molybdenum and 3.83% phosphorus.

The product prepared in accordance with Example 1, above, was tested as an extreme pressure agent in lubricating oil. A 2% solution in No. 30 base oil carried a load on the Shell Four-Ball EP Machine ("Four-Ball Testing Apparatus for Extreme Pressure Lubricants," Boerlage, Engineering 136, 46 (1933)) of 150 kg. before seizure. In the Almen EP Tester, the same oil carried a load of 28 pounds whereas the oil without additive failed at 8 pounds.

In accordance herewith, when referring to "unneutralized phosphorus sulfide-hydrocarbon reaction products," either in the specification or appended claims, it shall mean such phosphorus sulfide-hydrocarbon reaction products prepared in accordance with the descriptions herein contained which have not had as much as 1% of their titratable acid neutralized with a basic reagent.

The compositions of the present invention may be added to mineral lubricating oils in general in amounts of from .01% to about 10% by weight, and preferably from about .1% to about 4% by weight.

Lubricants containing compositions of the present invention may likewise have added thereto other anti-oxidants, oiliness agents, extreme pressure additives, etc., without in any way departing from the scope of the present invention.

Having thus described my invention, what I claim as novel and desire to protect by Letters Patent, is defined by the following claims:

1. A composition consisting essentially of the product resulting from the reaction at a temperature in the range of from about 25° to about 200° F. of (1) hydrogen peroxide, (2) a compound selected from the group consisting of oxides and sulfides molybdenum and vanadium and the salts of molybdic and vanadic acids with weak bases having a dissociation constant no greater than about $1 \times 10^{-3}$, which compound is capable of affording an oxide of the respective metal under reaction conditions, and (3) an oil-soluble material obtained by reacting an unneutralized phosphorus sulfide-hydrocarbon reaction product with a compound selected from the group consisting of alcohols, phenols, mercaptans, and thiophenols, said oil-soluble material being prepared at a temperature in the range of from about 150° F. to about 500° F.; said three components of the reaction being contacted in the following approximate proportions based upon one part of component (2), 1 to 40 parts of component (3), and 0.05 to 4 parts of component (1).

2. A lubricant comprising a mineral lubricating oil and from about 0.01% to about 10% by weight of the composition of claim 1.

3. A composition consisting essentially of the product resulting from the reaction at a temperature in the range of from about 25° to about 200° F. of (1) a compound selected from the group consisting of the oxides and sulfides of molybdenum and vanadium and the salts of molybdic and vanadic acids with weak bases, (2) hydrogen peroxide, and (3) an oil-soluble material obtained by reacting an unneutralized phosphorus sulfide-hydrocarbon reaction product with a compound selected from the group consisting of alcohols, phenols, mercaptans, and thiophenols, said oil-soluble material being prepared at a temperature in the range of from 150° F. to about 500° F.; said three components of the reaction being contacted in the following approximate proportions based upon one part of component (1), 1 to 40 parts of component (3), and 0.05 to 4 parts of component (2).

4. A composition of claim 3 wherein the unneutralized phosphorus sulfide-hydrocarbon reaction product was prepared by reacting $P_2S_5$ with a co-polymer of butylene and isobutylene.

5. A lubricant comprising a mineral lubricating oil and from about 0.01% to about 10% by weight of the composition of claim 3.

6. A composition consisting essentially of the product resulting from the reaction at a temperature in the range of from about 25° to about 200° F. of (1) a compound selected from the group consisting of the oxides and sulfides of molybdenum and vanadium and the salts of molybdic and vanadic acids with weak bases, (2) hydrogen peroxide, and (3) an oil-soluble material obtained by reacting an unneutralized phosphorus sulfide-hydrocarbon reaction product with an alcohol, said oil-soluble material being prepared at a temperature within the range of from about 150° F. to about 500° F.; said three components of the reaction being contacted in the following approximate proportions based upon one part of component (1), 1 to 40 parts of component (3), and 0.05 to 4 parts of component (2).

7. A lubricant comprising a mineral lubricating oil and from about 0.01% to about 10% by weight of the composition of claim 6.

8. The composition of claim 6 wherein the alcohol is n-hexanol.

9. A lubricant comprising a mineral lubricating oil and from about 0.01% to about 10% by weight of the composition of claim 8.

10. The composition of claim 6 wherein the alcohol is a mixture of isomeric alcohols having 9 carbon atoms.

11. A lubricant comprising a mineral lubricating oil and from about 0.01% to about 10% by weight of the composition of claim 10.

12. The composition consisting essentially of the product resulting from the reaction at a temperature in the range of from about 25° to about 200° F. of (1) a compound selected from the group consisting of the oxides and sulfides of molybdenum and vanadium and the salts of molybdic and vanadic acids with weak bases, (2) hydrogen peroxide, and (3) an oil-soluble material obtained by reacting an unneutralized phosphorus sulfide-hydrocarbon reaction product with a phenol, said oil-soluble material being prepared at a temperature in the range of from about 150° to 500° F.; said three components of the reaction being contacted in the following approximate proportions based upon one part of component (1), 1 to 40 parts of component (3), and 0.05 to 4 parts of component (2).

13. A lubricant comprising a mineral lubricating oil and from about 0.01% to about 10% by weight of the composition of claim 12.

14. The composition consisting essentially of the product resulting from the reaction at a temperature in the range of from about 25° to about 200° F. of $MoO_3$, hydrogen peroxide, and an oil-solube material prepared by reacting an unneutralized reaction product of $P_2S_5$ and a copolymer of butylene and isobutylene with an alcohol, said oil-soluble material being prepared at a temperature within the range of from about 150° F. to about 500° F.; said three components of the reaction being contacted in the following approximate proportions based upon one part of $MoO_3$; 1 to 40 parts of said oil-soluble material and 0.05 to 4 parts of hydrogen peroxide.

15. A lubricant comprising a mineral lubricating oil and from about 0.01% to about 10% by weight of the composition of claim 14.

16. The composition consisting essentially of the product resulting from the reaction at a temperature in the range of from about 25° to about 200° F. of (1) a compound selected from the group consisting of the oxides and sulfides of molybdenum and vanadium and the salts of molybdic and vanadic acids with weak bases, (2) hydrogen peroxide, and (3) an oil-soluble material obtained by reacting an unneutralized phosphorus sulfide-hydrocarbon reaction product with a mercaptan, said oil-soluble material being prepared at a temperature in the range of from about 150° to 500° F.; said three components of the reaction being contacted in the following approximate proportions based upon one part of component (1), 1 to 40 parts of component (3), and 0.05 to 4 parts of component (2).

17. The composition consisting essentially of the product resulting from the reaction at a temperature in the range of from about 25° to about 200° F. of (1) a compound selected from the group consisting of the oxides and sulfides of molybdenum and vanadium and the salts of molybdic and vanadic acids with weak bases, (2) hydrogen peroxide, and (3) an oil-soluble material obtained by reacting an unneutralized phosphorus sulfide-hydrocarbon reaction product with a thiophenol, said oil-soluble material being prepared at a temperature in the range of from about 150° to 500° F.; said three components of the reaction being contacted in the following approximate proportions based upon one part of component (1), 1 to 40 parts of component (3), and 0.05 to 4 parts of component (2).

References Cited in the file of this patent

UNITED STATES PATENTS 2,637,722  Frazier  May 5, 1953